(12) United States Patent
Hu

(10) Patent No.: US 11,592,456 B2
(45) Date of Patent: Feb. 28, 2023

(54) METHOD AND DEVICE FOR PROVIDING INFORMATION ON AN ANGULAR DISPLACEMENT OF A DC ELECTROMOTOR

(71) Applicant: MCI (Mirror Controls International) Netherlands B.V., Woerden (NL)

(72) Inventor: Jinku Hu, Delft (NL)

(73) Assignee: MCi (Mirror Controls International) Netherlands B.V., Woerden (NL)

(*) Notice: Subject to any disclaimer, the term of this patent is extended or adjusted under 35 U.S.C. 154(b) by 71 days.

(21) Appl. No.: 16/755,347

(22) PCT Filed: Oct. 12, 2018

(86) PCT No.: PCT/NL2018/050673
§ 371 (c)(1),
(2) Date: Apr. 10, 2020

(87) PCT Pub. No.: WO2019/074370
PCT Pub. Date: Apr. 18, 2019

(65) Prior Publication Data
US 2020/0300881 A1    Sep. 24, 2020

(30) Foreign Application Priority Data

Oct. 13, 2017  (NL) ........................... 2019723
Mar. 23, 2018  (NL) ........................... 2020654

(51) Int. Cl.
*G01P 3/489*   (2006.01)
*G01D 5/244*   (2006.01)

(52) U.S. Cl.
CPC .............. *G01P 3/489* (2013.01); *G01D 5/244* (2013.01)

(58) Field of Classification Search
CPC . G01P 3/48; G01P 3/489; G01D 5/244; H02P 7/0094
(Continued)

(56) References Cited

U.S. PATENT DOCUMENTS 4,744,041 A       5/1988  Strunk et al.
6,144,179 A  *  11/2000  Kessler ................. H02P 7/2805
                                                                    318/135

(Continued)

FOREIGN PATENT DOCUMENTS

CN        1992506 A      7/2007
CN      101953063 A      1/2011

(Continued)

OTHER PUBLICATIONS

Testa et al., "Pulse Counting Sensorless Detection of the Shaft Speed and Position of DC Motor Based Electromechanical Actuators", Journal of Power Electronics, vol. 14, No. 5, pp. 957-966, Sep. 2014.

*Primary Examiner* — Jermele M Hollington
*Assistant Examiner* — Sean Curtis
(74) *Attorney, Agent, or Firm* — Volpe Koenig

(57) ABSTRACT

Driving an electromotor and a brushed electromotor in particular results in ripples in the supply current. The amount of pulses is proportional to the amount of revolutions of the rotor of the electromotor. With a flawless motor, the amount of pulses is the same with each revolution. Flaws of the electromotor, in brushes, rotor, windings and/or other components, results in fluctuations of pulses in the supply current per revolution of the rotor. By comparing an expected amount of pulses to counted pulses and using various physical parameters of the electromotor, various methods may be employed to correct a counted amount of pulses or otherwise provide an appropriate value representing displacement of the rotor of the electromotor. The time (Continued)

between counted pulses may also be used for determining slip of a slip coupling comprised by a drive train to which the electromotor may be coupled.

11 Claims, 5 Drawing Sheets

(58) Field of Classification Search
USPC .......................................... 324/139, 166, 177
See application file for complete search history.

(56) References Cited

U.S. PATENT DOCUMENTS

| | | | |
|---|---|---|---|
| 6,437,533 B1 * | 8/2002 | Du .................. | H02P 7/0094 318/560 |
| 6,847,179 B2 * | 1/2005 | Du .................. | H02P 7/0094 318/560 |
| 7,064,509 B1 * | 6/2006 | Fu .................. | H02P 7/0094 318/253 |
| 7,122,982 B2 * | 10/2006 | Sasaya ............. | H02P 7/0094 388/909 |
| 7,352,145 B2 * | 4/2008 | Moller .............. | H02P 5/68 318/254.1 |
| 7,668,690 B2 * | 2/2010 | Schneider .......... | H02P 7/2805 318/470 |
| 7,800,321 B2 * | 9/2010 | Knittel ............. | G01P 3/48 318/245 |
| 8,138,701 B2 * | 3/2012 | Knezevic ........... | G01D 5/165 318/254.1 |
| 8,169,178 B2 * | 5/2012 | Letor ............... | H02P 7/28 318/632 |
| 8,354,808 B2 * | 1/2013 | Uebel .............. | H02K 23/66 318/470 |
| 8,513,909 B2 * | 8/2013 | Knezevic ........... | H02P 7/05 318/565 |
| 8,742,714 B2 * | 6/2014 | Holzmann .......... | G05B 19/4062 318/128 |
| 9,628,006 B2 * | 4/2017 | Hernandez .......... | H02P 7/0094 |
| 9,772,199 B2 * | 9/2017 | Morawek ........... | G01D 5/24476 |
| 10,536,100 B2 * | 1/2020 | Jordan .............. | H02P 6/24 |
| 10,693,399 B2 * | 6/2020 | Yanagita ............ | H02P 6/16 |
| 11,070,151 B2 * | 7/2021 | Jordan .............. | B60N 2/0248 |
| 2003/0011336 A1 | 1/2003 | Kramer et al. | |
| 2005/0179409 A1 | 8/2005 | Honma et al. | |
| 2008/0298784 A1 * | 12/2008 | Kastner ............. | G01P 3/44 388/811 |
| 2009/0254300 A1 | 10/2009 | Schneider et al. | |
| 2010/0171457 A1 * | 7/2010 | Letor ............... | G01P 3/48 318/490 |
| 2010/0259249 A1 | 10/2010 | Morawek | |
| 2012/0062156 A1 * | 3/2012 | Uebel .............. | H02P 7/04 318/400.12 |
| 2013/0043820 A1 * | 2/2013 | Knezevic ........... | G05B 19/232 318/603 |
| 2015/0214871 A1 * | 7/2015 | Saglime, III ........ | G01R 25/04 318/400.32 |
| 2015/0219473 A1 * | 8/2015 | Morawek ........... | G01D 5/2449 702/151 |
| 2015/0229254 A1 * | 8/2015 | Hernandez .......... | H02P 7/0094 318/490 |
| 2017/0288582 A1 * | 10/2017 | Jordan .............. | H02P 7/0094 |
| 2020/0044588 A1 * | 2/2020 | Yanagita ............ | H02P 7/06 |
| 2020/0119670 A1 * | 4/2020 | Jordan .............. | H02P 6/24 |
| 2020/0186062 A1 * | 6/2020 | Fancellu ............ | H02P 7/0094 |
| 2020/0270913 A1 * | 8/2020 | Marlia .............. | E05B 81/56 |
| 2020/0295678 A1 * | 9/2020 | Thomann ........... | H02P 6/007 |
| 2020/0300881 A1 * | 9/2020 | Hu .................. | G01P 3/489 |
| 2020/0343842 A1 * | 10/2020 | Breynaert .......... | H02P 7/0094 |
| 2021/0167704 A1 * | 6/2021 | Jordan .............. | B60N 2/0232 |

FOREIGN PATENT DOCUMENTS

| | | | |
|---|---|---|---|
| CN | 102007685 A | 4/2011 | |
| CN | 101174154 B * | 7/2012 | ............... H02P 7/00 |
| CN | 103684146 A | 3/2014 | |
| CN | 103688460 A * | 3/2014 | ............... B60N 2/02 |
| CN | 104972974 A | 10/2015 | |
| CN | 205015744 U | 2/2016 | |
| CN | 107040173 A | 8/2017 | |
| CN | 107276483 A * | 10/2017 | ........... B60N 2/0232 |
| CN | 111098808 A * | 5/2020 | ............. B60R 16/02 |
| DE | 102010021080 A1 | 11/2011 | |
| DE | 102017107010 A1 * | 10/2017 | ........... B60N 2/0232 |
| EP | 1903668 A2 | 3/2008 | |
| EP | 3700082 A1 * | 8/2020 | ............. F16H 59/10 |
| JP | H0619423 B2 | 3/1994 | |
| JP | 3547523 B2 * | 7/2004 | ........... B60N 2/0244 |
| JP | 3555226 B2 * | 8/2004 | |
| JP | 2004268833 A * | 9/2004 | ............... B60R 1/07 |
| JP | 2004268871 A * | 9/2004 | ............... B60R 1/07 |
| JP | 2017189102 A * | 10/2017 | ........... B60N 2/0232 |
| JP | 2018074662 A * | 5/2018 | ............. G01R 31/34 |
| JP | 6665070 B2 * | 3/2020 | ............. G01R 31/34 |
| JP | 2020537142 A * | 12/2020 | |
| KR | 20170113449 A * | 10/2017 | |
| KR | 20200091399 A * | 7/2020 | |
| WO | WO-2014053889 A1 * | 4/2014 | ............. H02P 7/0094 |
| WO | WO-2018069380 A1 * | 4/2018 | ............. E05F 15/611 |
| WO | WO-2018079128 A1 * | 5/2018 | ............. G01R 31/34 |
| WO | WO-2019068517 A1 * | 4/2019 | ............. H02P 6/007 |
| WO | WO-2019074370 A2 * | 4/2019 | ............. G01D 5/244 |
| WO | WO-2019137933 A1 * | 7/2019 | ............. H02P 7/0094 |

* cited by examiner

METHOD AND DEVICE FOR PROVIDING INFORMATION ON AN ANGULAR DISPLACEMENT OF A DC ELECTROMOTOR

CROSS REFERENCE TO RELATED APPLICATIONS

This application is a 35 USC § 371 National Stage application of International Patent Application No. PCT/NL2018/050673, which was filed Oct. 12, 2018, entitled "METHOD AND DEVICE FOR PROVIDING INFORMATION ON AN ANNULAR DISPLACEMENT OF A DC ELECTROMOTOR," which claims priority to Netherlands Patent Application No. 2019723, filed Oct. 13, 2017, and Netherlands Patent Application No. 2020654, filed on Mar. 23, 2018, and are incorporated herein by reference as if fully set forth.

TECHNICAL FIELD

The various aspects and embodiments thereof relate to providing information on angular displacement of a brushed DC electromotor based on processing of variations in energy supply.

BACKGROUND

Angular speed of the rotor of an electromotor may be determined by counting variations in energy supply, in supply current, voltage or both. By counting the variations, like ripples, the amount of revolutions of the rotor may be determined. With that, an amount of displacement of an actuator coupled to the rotor, for example by means of a drive train, may be determined. Patent application WO2016/080834 provides information on this matter.

SUMMARY

It is preferred to provide a more accurate information on the angular displacement of the rotor and/or more accurate information on displacement of an element actuated by means of the electromotor.

A first aspect provides a method on an angular position of a brushed DC electromotor. The method comprises monitoring a supply current for obtaining an indicator of an average angular speed, based on the indicator, determining an expected time period between two consecutive pulses in the supply current, obtaining a counted pulse amount by counting pulses in the supply current and determining a measured time period between two counted consecutive pulses. The method further comprises adjusting the count in at least one of the following ways to obtain an adjusted counted pulse amount: if the measure time period is less than the expected time period by more than a first pre-determined threshold, adjust the counted pulse amount by not counting the second pulse and if the measured time period is more than the expected time period by more than a second pre-determined threshold, adjust the counted pulse amount by adding one.

Due to imperfections in manufacturing, artefacts on the rotor of the electromotor may occur that may cause one or two additional ripples in the supply current per revolution of the rotor. These additional pulses may be detected by monitoring time between pulses. With a particular rotational speed of the rotor, that may be determined by means of the indicator, a global time period between two pulses or a pulse duration may be estimated. If after a first pulse a second pulse occurs, within half the time at which usually a pulse is expected, the second pulse is not to be taken into account for determining the rotational displacement of the rotor of the motor. This may be effectuated by counting the additional pulse and subtracting it or by not counting the additional pulse.

Due to similar manufacturing issues, due to changes in supply current, due to other causes or a combination thereof, no pulse may occur where a pulse is expected or no pulse is detected at a moment a pulse is expected. In such case, the time between two consecutive pulses is usually twice as long or at least significantly longer than expected. In such case, the counted amount of pulses is corrected by adding one to the counted amount of pulses.

In an embodiment, the indicator is at least one of a supply current, a supply voltage and the ambient temperature, the method further comprising looking up, in a reference file, an angular speed corresponding to the at least one of the supply, and the supply voltage and the ambient temperature.

Electromotors have specific characteristics with respect to current and speed vs. torque. Roughly, speed and torque are related in a negative proportional relation and current and torque are related in a positive proportional relation. The point where the torque-speed curve and the torque-current curve meet one another is the working point of the electromotor. With characteristics of the electromotor known, stored in the reference file, a current level provides information on the rotational speed. With the rotational speed known and an amount of conductors or transitions between conductors provided on the rotor at the location of the brush contacts, an expected amount of pulses may be determined that is to be counted for one revolution of the rotor.

In another embodiment, the indicator is a time related factor providing an indication of an average time period between two consecutive pulses.

By determining an expected single pulse duration from an average, a proper indication is provided when a next pulse may be expected. Should a pulse occur sooner than that, count can be adjusted. Alternatively, or additionally, other time related indicators may be used.

A second embodiment provides a method of determining a position of an actuatable object arranged to be driven by a brushed DC electromotor. The method comprises the method according to the first aspect and, based on the adjusted counted pulse amount, determining a position of the actuatable object.

As the counting of pulses and adjustment of the count to correct for errors provides a proper indication for rotational displacement of the rotor, the counted amount also provides a proper indication of an actuatable element coupled to the rotor of the electromotor, either directly or via a drive train.

An embodiment comprises obtaining an initial position of the actuatable object and determining the position of the actuatable object based on the adjusted counted pulse amount and the initial position of the actuatable object.

By counting the amount of pulses, the displacement may be calculated. By adding the displacement to the initial position, the new position may be determined.

Another embodiment comprises driving the actuatable object by providing the electromotor with a supply current and monitoring the supply current. If the waveform of the supply current complies with at least one pre-determined condition, it is determined the actuatable object has reached an outer position.

This embodiment provides information on an outer position. This information may be used for calibration of the actuatable element or to stop the electromotor for preventing damage.

A third embodiment provides a device for providing information on an angular speed of a DC electromotor. The device comprises a monitoring module arranged to monitor a supply current for obtaining an indicator of an average angular speed and a processing module. The processing module is arranged to, based on the indicator, determine an expected time period between two consecutive pulses in the supply current, obtain a counted pulse amount by counting pulses in the supply current, determine a measured time period between two counted consecutive pulses. The processing unit is further arranged to adjust the count in at least one of the following ways to obtain an adjusted counted pulse amount: if the measure time period is less than the expected time period by more than a first pre-determined threshold, adjust the counted pulse amount by subtracting one and if the measured time period is more than the expected time period by more than a second pre-determined threshold, adjust the counted pulse amount by adding one.

A fourth aspect provides a control system for actuating an actuatable element of a motorised vehicle. The system comprises the device according to the third aspect, a DC electromotor and a drive train for coupling the DC electromotor to the actuatable element. The drive train comprises a first transmission element connected to the DC electromotor; and a second transmission element arranged to be connected to the actuatable element. In this drive train, the first transmission element and the second transmission element are arrange to engage with one another such that the first transmission element and the second transmission element move together if a coupling torque between the first transmission element and the second transmission element is below a pre-determined torque level and the first transmission element and the second transmission element slip relative to one another if the coupling torque is above a pre-determined torque level.

A fifth aspect provides a rearview mirror module comprising the system according to the fourth aspect and a rearview mirror as the actuatable element.

A sixth aspect provides a motorised vehicle comprising the control system according to the fourth aspect and the actuatable element.

BRIEF DESCRIPTION OF THE DRAWINGS

The various aspects and embodiments thereof will now be further elucidated in conjunction with drawings. In the drawings.

DETAILED DESCRIPTION

Figure 1:
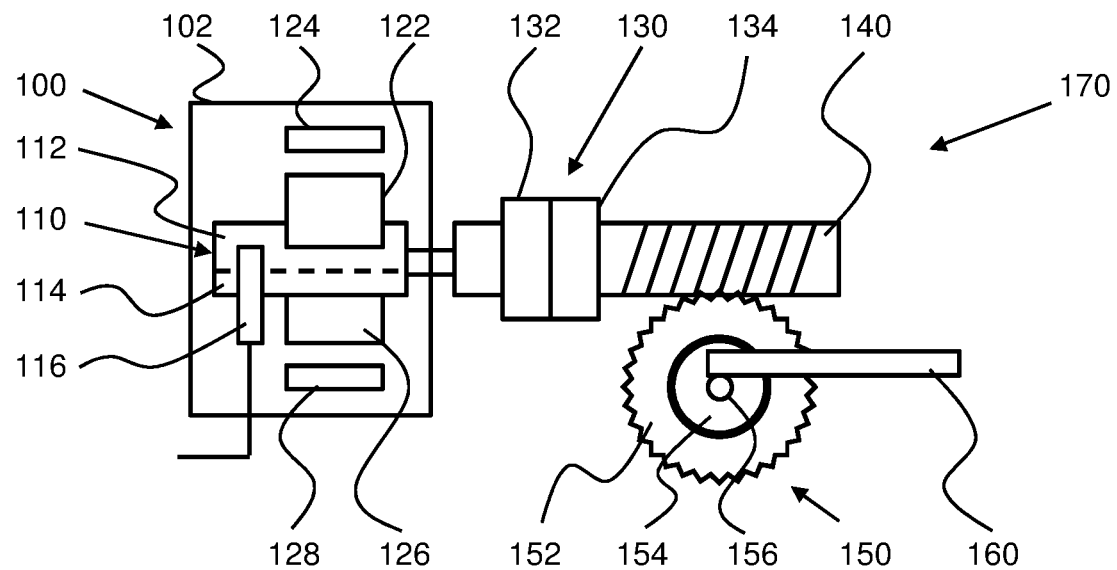
FIG. 1: shows an electromotor connected to a rear view mirror via a drive train.

FIG. 1 shows a DC electromotor 100 that is coupled to a rear view mirror 160 via a drive train 170. The electromotor 100 comprises a housing 102, in which housing 102 a rotor 110 is provided. On the rotor 110, a first conductor 112 and a second conductor 114 are provided. Furthermore, one or more additional conductors are provided on the rotor 110. The conductors are provided for providing a current from the brush contact 116 to the first electromagnets 122 and the second electromagnet 126, provided as coils on the rotor 110. In the housing 102, also a first permanent magnet 124 and a second permanent magnet 128 are provided. Thus, the DC electromotor 100 is a commonly known electromotor as generally commercially available.

The drivetrain 170 comprises a slip coupling 130 provided between the rotor 110 and a worm wheel 140. The drivetrain 170 further comprises a toothed wheel or a gear 150 that is preferably provided on an axle 158. The connection between the worm wheel 140 and the gear 150 allows for a signification reduction in rotational speed, preferably in the order or a factor 50.

The first slip coupling 130 comprises a first slip part 132 connected to the rotor 100 and a second slip part 134 connected to the worm wheel 140. In normal operation, the first slip part 132 and the second slip part 134 rotate together. If the torque between the worm wheel 140 and the rotor 110 exceeds a pre-determined torque threshold, the second slip part 134 stalls and the first slip part 132 continues to rotate, in which operational state the slip coupling 130 is in slip mode. If the slip coupling 130 goes into slip, usually first the full drive train 170 will stall. Subsequently, the slip coupling 130 will run into slip mode. Depending on characteristics of contact surfaces of the first slip part 132 and the second slip part 134, the slip coupling 130 will stay in slip operation or alternate between slip and stall mode.

Additionally or alternatively, a second slip coupling is provided in the gear 150. The gear 150 comprises in this embodiment an outer ring 152 and an inner ring 154. Between the inner ring 152 and the outer ring 154, the second slip coupling 156 is provided. The operation of the second slip coupling 156 is similar to that of the first slip coupling 130. The rear view mirror 160 is connected to the inner ring 156.

Whereas in this embodiment the electromotor 100 is used for actuating the rear view mirror 160, in other embodiments other actuatable parts of a car or other motorised vehicle may be actuated. Such actuatable parts may be a full rear view module including mirror and mirror adjustment arrangements, shutters for a grille, actuatable spoilers or other air guiding flaps, screen wipers, doors, other, or a combination thereof.

Figure 2:
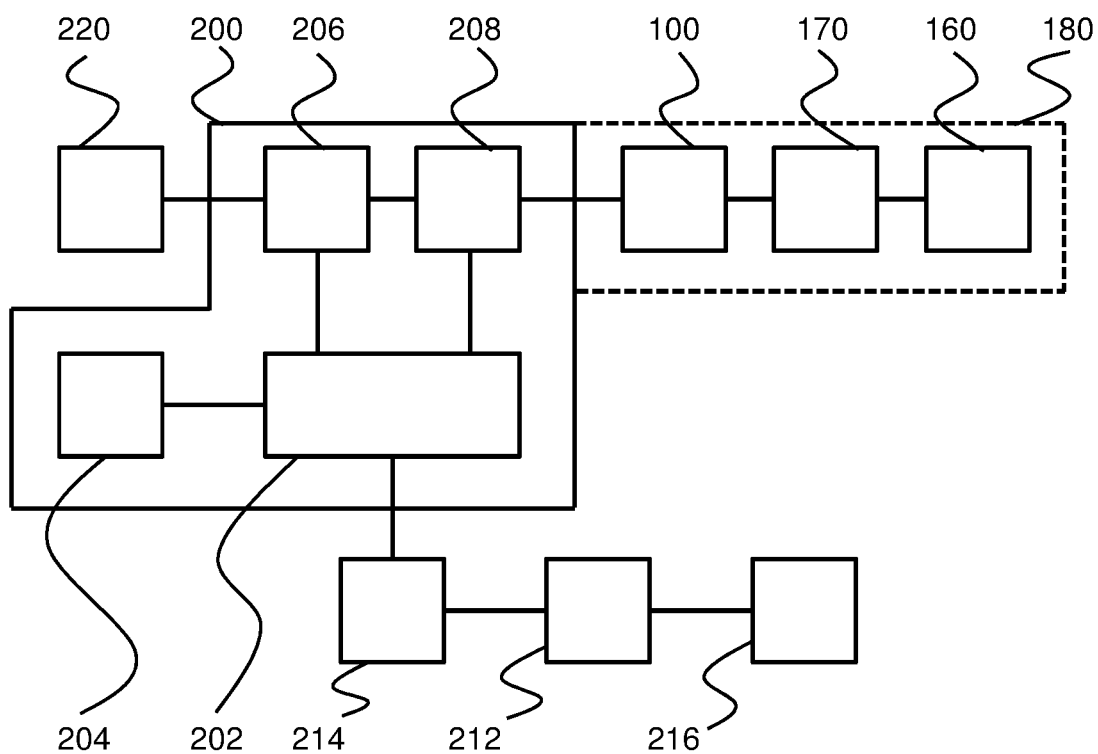
FIG. 2: shows a schematic view of a local control element in a vehicle network, connected to a battery and an electromotor.

FIG. 2 shows a schematic view of a control system for operating the adjustment system shown by FIG. 1. FIG. 2 shows a control module 200 for controlling operation of the adjustment system, a battery 220 for providing electrical power to the electromotor 110, a central vehicle control unit 212 that is coupled to the control module 200 via a vehicle bus 214, a button 216 or a set of buttons as a user input unit and the adjustment system 180. The vehicle bus 214 may operate in accordance with the CAN protocol, the LIN protocol, another protocol or a combination thereof.

The battery 220 is shown as coupled to the control module 200 and it is coupled to the central vehicle control unit 212 as well. The button 216 is connected to the central vehicle control unit 212 for providing user commands. The control module 200 is coupled to the adjustment system 180.

The control module 200 comprises a switch 206 for switching power supply from the battery 220 to the electromotor 110 of the adjustment system 180. Between the switch 206 and the adjustment system 180, a current sensor 208 is provided. The current sensor 208 is arranged to sense current switched by the switch 206 and supplied to the electromotor 100. Optionally, an additional voltage sensor is provided. The switch 206 and the current sensor 208 are connected to a local control unit 202. To the local control unit 202, also a local memory 204 is connected.

Figure 3:
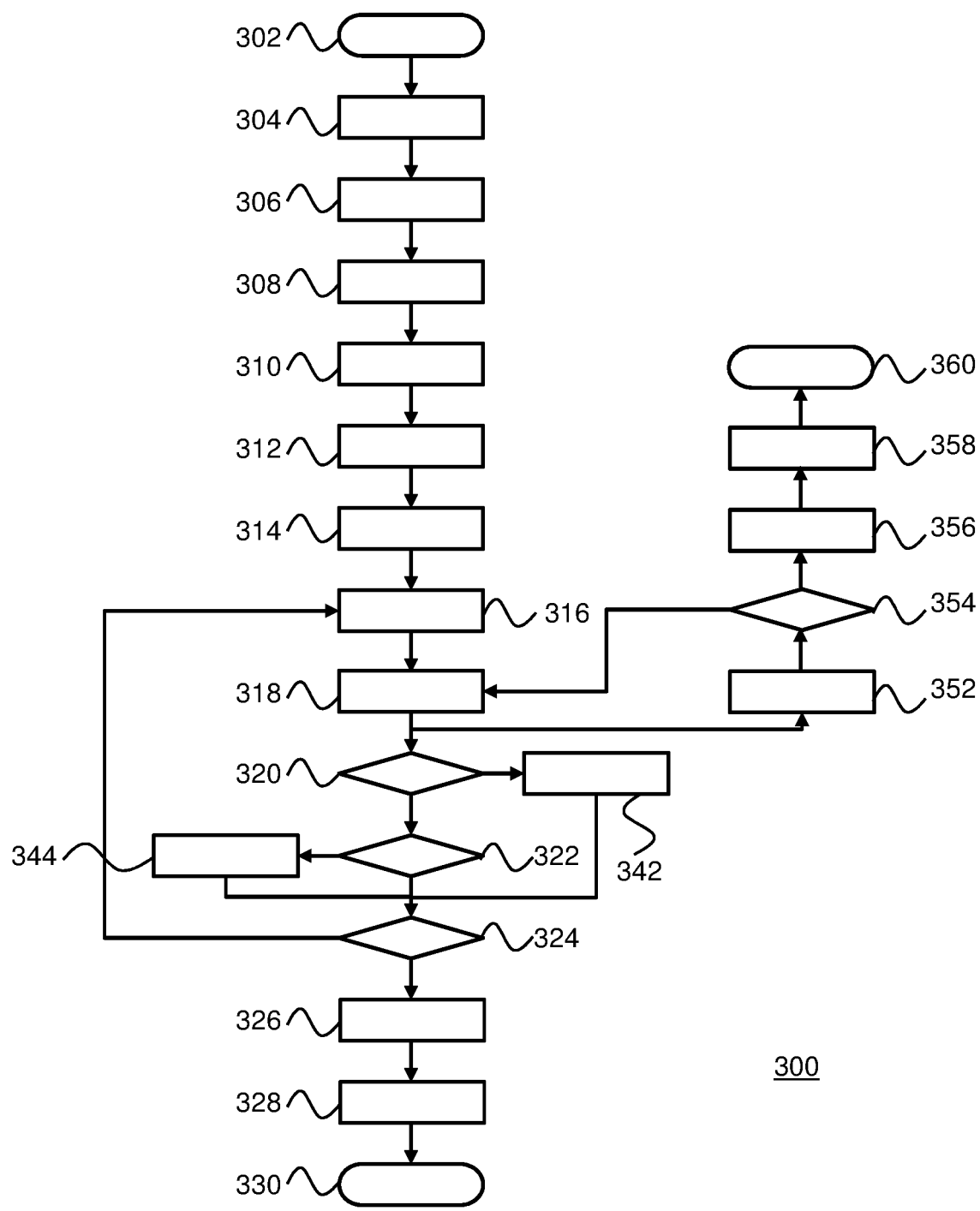
FIG. 3: shows a first flowchart depicting a method for adjusting ripple count and accurately determining rotor displacement.

The further functionality of the control module 200 and the adjustment system 180 will be discussed in further detail in conjunction with a flowchart 300 shown by FIG. 3. The various parts of the flowchart are briefly summarised in the list below.

| | |
|---|---|
| 302 | start procedure |
| 304 | receive input command |
| 306 | determine initial position |
| 308 | determine end position |
| 310 | determine number of counts required |
| 312 | start motor |
| 314 | determine expected time between pulses |
| 316 | count pulse + 1 |
| 318 | determine time from previous pulse |
| 320 | period below range? |
| 322 | period above range? |
| 324 | required amount of pulses reached? |
| 326 | switch off motor |
| 328 | store position |
| 330 | end procedure |
| 342 | reduce count by one |
| 344 | increase count by one |
| 352 | determine time period vs. time |
| 354 | above threshold? |
| 356 | stop electromotor |
| 358 | store position as initial position |
| 360 | end procedure |

The procedure starts in a terminator 302 and continues to step 304 in which a user input command is received. The user input command is provided by means of the button 216 and communicated via the central vehicle control unit 212 and the vehicle bus 214 to the local control unit 202. Alternatively, the command is provided by the button 216 directly to the local control unit 202. In step 306, an initial position or the current position of the rear view mirror 160 is determined. Preferably, the position of rear view mirror 160 is retrieved from the local memory 204.

Subsequently, in step 308, an end position is determined. The end position may be determined in several ways. The end position of the rear view mirror 160 may be based on a memory position, for example stored in the local memory 204. Alternatively or additionally, the end position may be determined by a user command provided by means of the button 216. The user command provided by means of the button 216 or another input device may indicate a particular absolute end position or a movement with a particular amount, thus indicating a relative end point of the movement.

Based on the initial position of the rear view mirror 160 and the determined end position of the rear view mirror 160, an amount of pulse counts is determined. On the rotor 110 of the electromotor 100, the first conductor 112, the second conductor 114 and more conductors are provided. Preferably, at least three conductors are provided, for providing current to at least three windings. The conductors on the rotor 110 are separated by an insulator.

At each transition of the brush contact 116—and that of another brush contact opposite to the brush contact 116—from one rotor conductor to another rotor conductor, a slight change occurs in the supply current to the motor 100. With three windings, two brush contacts and three conductors, six pulses occur within one revolution of the rotor 110 and, with full coupling, within one revolution of the worm wheel 140. If the rotor 110 of the electromotor 100 carries more conductors, more pulses will occur in the supply current during one rotation of the rotor 110.

Based on the amount of pulses in the supply current during one revolution of the rotor 110 and the transmission ratio of the drive train 170, an amount of pulses to occur in the supply current for a particular movement of the gear 150 or the rear view mirror 160, for example from the initial position to the end position, is determined in step 310. Subsequently or in parallel, in step 312 the electromotor 100 may be provided with a supply current for driving the electromotor 100.

The procedure proceeds with determining an expected time between pulses in step 314. This may be done in several ways. Firstly, an amount of pulses is counted over a particular time interval and the average duration of a pulse is determined. The pulse duration may be determined as a duration from top to top, from a rising slope to another rising slope, from a falling slope, otherwise or a combination thereof, with respect to the first pulse counted and the last pulse counted.

Alternatively or additionally, the amount of pulses is determined based on an estimated rotational speed of the electromotor 100, based on at least one of the supply current and supply voltage to the electromotor. This may be executed by means of the current sensor 208 and additionally or alternatively by the optional voltage sensor. Within the control module 200 and in the local memory 204 in particular, data is available to determine the rotational speed of the rotor 110. Electromotors have specific characteristics with respect to current and speed vs. torque. Roughly, speed and torque are related in a negative proportional relation and current and torque are related in a positive proportional relation.

The point where the torque-speed curve and the torque-current curve meet one another is the working point of the electromotor 100. With characteristics of the electromotor 100 known, a current level provides information on the rotational speed. With the rotational speed known and the amount of conductors or transitions between conductors provided on the rotor 110 at the location of the brush contact 106, an amount of pulses may be determined that is to be counted for one revolution of the rotor 110.

In one example of determining an expect amount of pulses that may be combined with the procedures explained above, the expected time between pulses is multiplied by the amount of brush contacts in the electromotor 100. During use of the electromotor 100, the location of the brushes may change over time. For example, for a two-brush electromotor, the angular distance between two brushes may change. This results in a first time period between an odd and an even pulse number may be different from a second time period between an even and an odd pulse number. This issue is resolved by multiplying the expect time between pulses by the amount of brush contacts in the electromotor 100, improving accuracy of counting.

Subsequently, pulses are counted in the supply current to the electromotor 100. The pulses are counted by means of the current sensor 208 and the local control unit 202. Either one or both may be provided with further electronics for determining the occurrence of a pulse, like comparators, trigger units, other, or a combination thereof. Once a pulse is determined, a counter value is increased by one in step 316. Prior to the first count, the counter value may be reset, for example by setting it to zero.

In step 318, the time period between the counted pulse and the previous pulse is determined. Otherwise, the time from the counted pulse to the next pulse is determined. Subsequently, the determined time period is assessed to an acceptable pulse time range. Whereas the electromotor 100 is intended to run at a more or less constant speed, provided with a more or less constant current, the pulse period will vary. One cause for this may be imperfections in the manufacturing of the electromotor, like slight differences in distances between transitions in the conductors on the rotor 110. Another cause may be variations in supply current, for example due to disturbances caused by other devices powered by the battery 220.

Alternatively, in step 318, a time between multiple pulses is determined. Preferably, a time period between a number of pulses is determined, which number of pulses is equal to the amount of brush contacts in the electromotor 100—or a multiple thereof. As discussed above, such counting method increases accuracy as it eliminates or at least reduces effects of wear and brush displacement.

Figure 4:
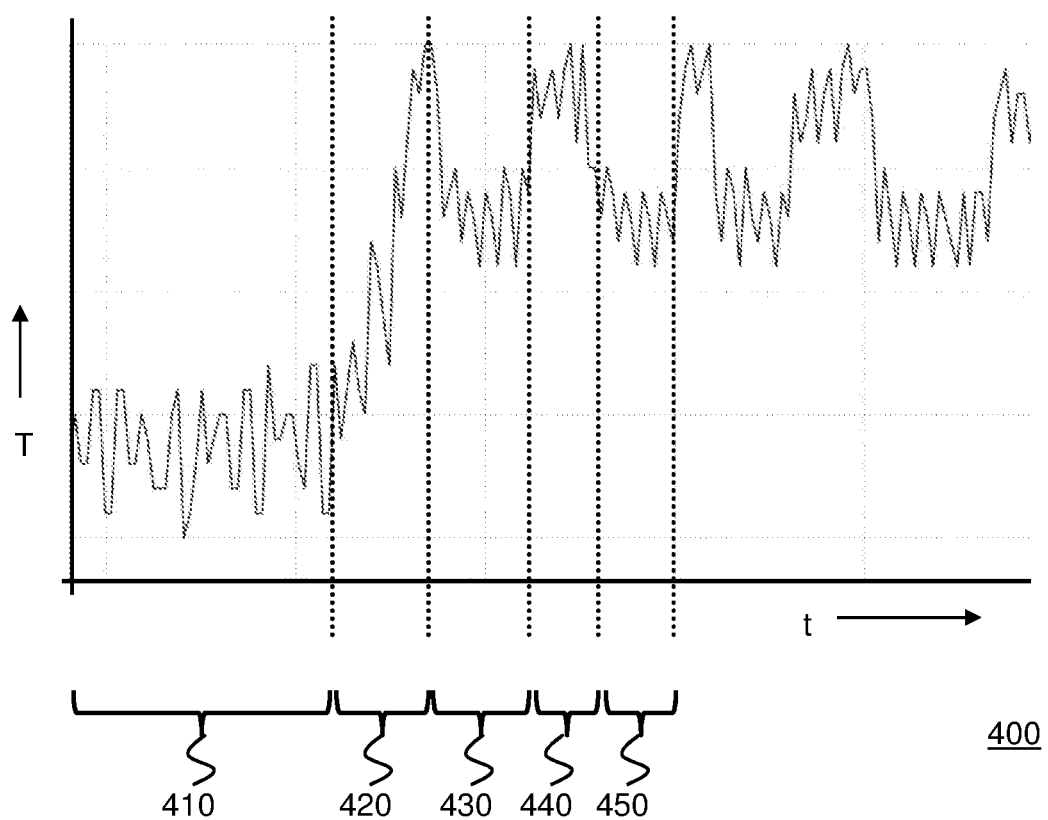
FIG. 4: shows a graph depicting ripple time period vs. time.

FIG. 4 shows a graph 400 depicting measured pulse duration vs. time lapsed in a practical example. Normal operation is provided in a first time period 410. FIG. 4 shows the pulse duration during normal operation varies as a function of time, yet within a certain range. Hence, for determining whether the pulse duration measured is a measure for compliant operation, the pulse duration is preferably in a particular range, rather than at a particular value.

The acceptable pulse time range is preferably determined based on the expected pulse time as determined in step 314. The acceptable pulse time range may be set to range from the expected pulse time—or the estimated pulse time—minus an absolute or relative margin—for example 5%, 10% or 20%—to the expected pulse time plus the margin.

In step 320, it is determined whether the determined period between two consecutive pulses is below the acceptable pulse time range. In one preferred embodiment, these are two directly consecutive pulses. In another embodiment, the period is determined between multiple pulses, which multiple is preferably equal to the amount of brushes of the electromotor 100 or a multiple thereof.

If the determined period between two consecutive pulses is below the acceptable pulse time range, the process branches to step 342, in which the counted amount is reduced by one. A reason for doing so is because a too small time period between two determined pulses may provide an indication that the pulse occurred due to an error, rather than through a transition of the brush contact 116 from the first conductor 112 to the second conductor 114. This may be due to a manufacturing error in the system of the electromotor 100, a detection error, other, or a combination thereof.

If the determined period between two consecutive pulses is above the acceptable pulse time range, which is determined in step 326, the process branches to step 344 in which the counted value is increased by one. In this way, the counted pulse amount is corrected for erroneous counts or erroneously missed counts. This allows the counted pulse amount to provide a proper estimate for a number of revolutions of the rotor 110 and the worm wheel 140 and with that, the position of the rear view mirror 160.

Subsequently, the procedure continues to step 324, in which the counted amount, after correction in case required, is compared to the amount determined in step 310. If the amounts match or differ by less than a predetermined threshold, either expressed in an amount or ratio (percentage), the procedure continues to step 326 in which the power supply to the electromotor 100 is switched off by means of the switch 206. The procedure continues to step 328 in which information on the position of the rear view mirror is stored in a memory like the local memory 204 and the procedure ends in step 330. If it is determined in step 324 the counted amount of pulses is below or too far below the amount determined in step 310, the process branches back to step 316.

After step 318 has been executed by determining time period between two pulses, the process preferably forks to step 352 as well, in addition to proceeding to step 320. In step 352, the time period between pulses is determined over time. This may be executed by means of linear regression or another algorithm for determining a derivative value, local or average, of the time period between pulses vs. time.

In step 354, the derivative value is tested. If the derivative value of the pulse time against time lapsed is below a particular threshold, the procedure loops back to step 318. And if the change and in particular the increase of the time period between two consecutive pulses is too high, this may be a sign of slip of the slip coupling 130 and/or of the second slip coupling 156. Slip of the slip couplings occurs if the torque on the slip couplings is above a particular threshold. Such may be the case if the rear view mirror 160 moves against an abutment and cannot move any further or only with excessive force which may lead to damage. Slip starts in the second time period 420 as depicted in FIG. 4.

If the derivative value of the pulse time against time lapsed is above the particular threshold, the process continues to step 356 in which power supply to the electromotor is switched off. Subsequently, the position of the rear view mirror 160 is stored in a memory. The position data stored may be an angle of the mirror or merely an indication the rear view mirror 160 is at a particular outer position of its trajectory. The procedure subsequently ends in step 360.

Figure 5:
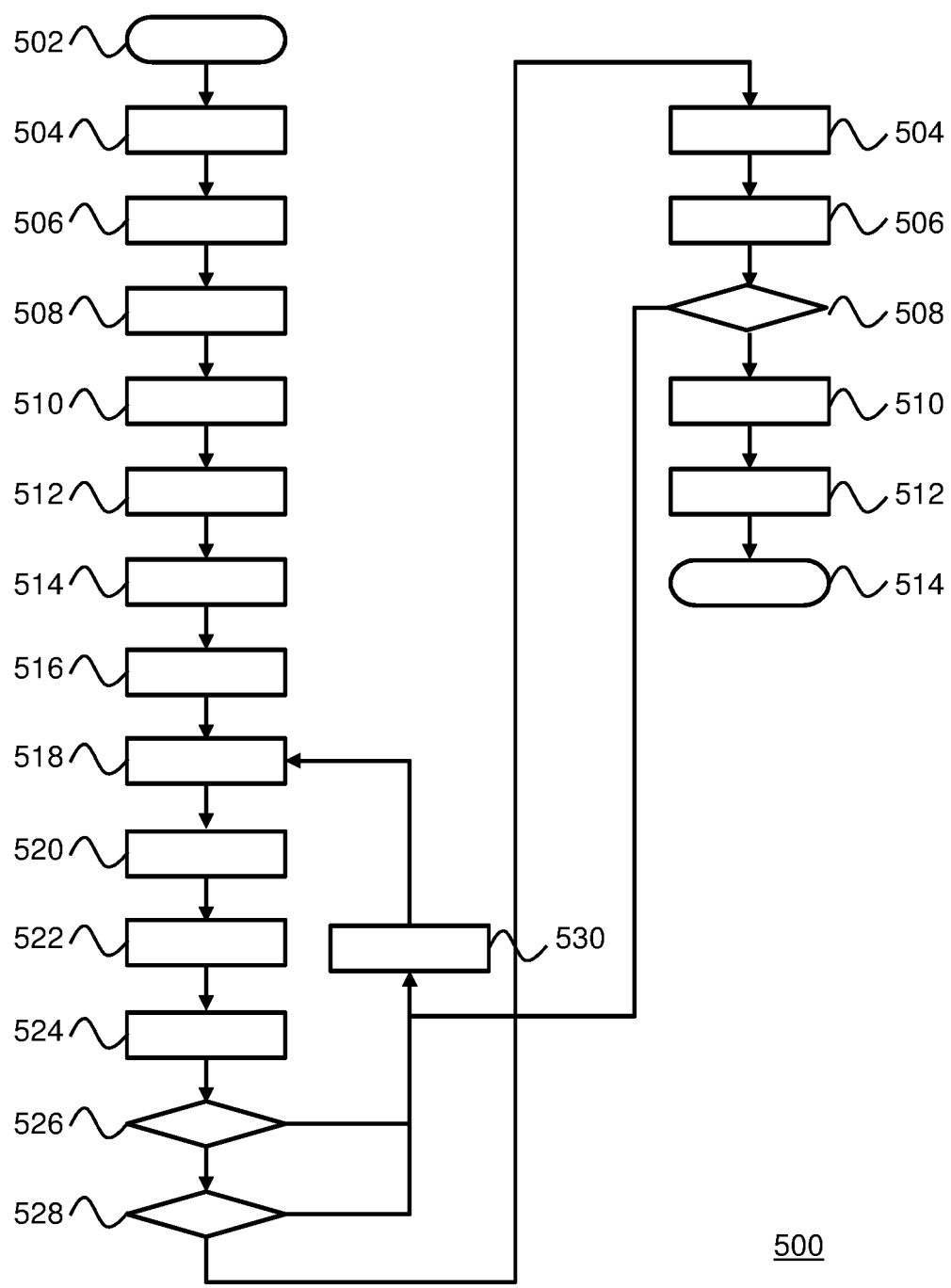
FIG. 5: shows a second flowchart depicting an alternative method for determining ripple count.

Flowchart 500 as shown by FIG. 5 shows another method for providing a more accurate ripple count. The various parts of the flowchart are briefly summarised in the list below.

| | |
|---|---|
| 502 | start procedure |
| 504 | receive input command |
| 506 | determine initial position |
| 508 | determine end position |
| 510 | determine number of counts required |
| 512 | start motor |
| 514 | obtain motor winding resistance |
| 516 | obtain sampling frequency |
| 518 | sample supply voltage |
| 520 | sample supply current |
| 522 | determine back EMF |
| 524 | add value to memory value |
| 526 | ripple detected? |
| 528 | memory value multiple of determined value? |
| 530 | to next sample |
| 532 | add value of determined multiple to ripple count |
| 534 | reset multiple to 1 |
| 536 | set memory value to 0 |
| 538 | required amount of pulses reached? |
| 540 | stop electromotor |
| 542 | store position as initial position |
| 544 | end procedure |

The procedure starts in a terminator 502 and continues to step 504 in which a user input command is received. The user input command is provided by means of the button 216 and communicated via the central vehicle control unit 212 and the vehicle bus 214 to the local control unit 202. Alternatively, the command is provided by the button directly to the local control unit 202. In step 506, an initial position or the current position of the rear view mirror 160 is determined. Preferably, the position of rear view mirror 160 is retrieved from the local memory 204.

Subsequently, in step 508, an end position is determined. The end position may be determined in several ways. The end position of the rear view mirror 160 may be based on a memory position, for example stored in the local memory 204. Alternatively or additionally, the end position may be determined by a user command provided by means of the button 216. The user command provided by means of the button 216 or another input device may indicate a particular absolute end position or a movement with a particular amount, thus indicating a relative end point of the movement.

Based on the initial position of the rear view mirror 160 and the determined end position of the rear view mirror 160, an amount of pulse counts or revolutions of the rotor 110 is determined. On the rotor 110 of the electromotor 100, The first conductor 112, the second conductor 114 and more conductors are provided. Preferably, at least three conductors are provided, for providing current to at least three windings. The conductors on the rotor 110 are separated by an insulator.

At each change of the brush contact 116—an that of another brush contact opposite to the brush contact 116— from one rotor conductor to another rotor conductor, a slight change occurs in the supply current to the motor 100. With three windings, two brush contacts and three conductors, six pulses occur within one revolution of the rotor 110 and, with full coupling, within one revolution of the worm wheel 140. If the rotor 110 of the electromotor 100 carries more conductors, more pulses will occur in the supply current during one rotation of the rotor 110.

Based on the amount of pulses in the supply current during one revolution of the rotor 110 and the transmission ratio of the drive train 170, an amount of pulses to occur in the supply current for a particular movement, for example from the initial position to the end position, is determined in step 510. Subsequently or in parallel, in step 512 the electromotor 100 may be provided with a supply current for driving the electromotor 100.

The procedure proceeds with obtaining the motor winding resistance in step 514. This may be done in several ways. In a first embodiment, the motor winding resistance value is obtained from a memory in which a typical value of the resistance of the windings of the electromotor has been stored. Alternatively or additionally, the resistance value is determined while powering the motor such that the back EMF—electromagnetic force—is negligible.

Subsequently, in parallel or prior to determining the winding resistance, a sampling frequency is determined in step 516 with which the supply current of the electromotor is sampled. Hence, this step may also be executed prior to step 512. This may be a standard value, stored in a memory, or a dynamic value. This step may comprise setting the actual sampling value, merely reading a value from a memory, obtaining the value otherwise or a combination thereof.

With the electromotor running, a sample is taken from the supply voltage of the electromotor and the supply current to the electromotor in step 518. The value of the supply voltage may be actually separately measured or, alternatively or additionally, obtained from a control network of the vehicle as the battery voltage. At substantially the same moment, the value of the supply current to the electromotor is sampled in step 520.

In step 520, the approximate back EMF is determined by multiplying the sampled current value with the sampled voltage value. This approximation is allowed for the following reason:

The back EMF—BEMF—is determined as:

$$V_{bat} = BEMF + R \cdot I + \varepsilon \frac{di}{dt}$$

With $V_{bat}$ being the supply or battery voltage, R being the winding resistance, I being the supply current, $\varepsilon$ being a constant and di/dt the derivative of the supply current over time.

Considering that the last term is negligible as the supply current is substantially contact in steady state operation and the assumption that the back EMF is linearly related to the annual frequency of the rotor 110 of the electromotor 100, the equation may be rewritten as:

$$V_{bat} - R \cdot I = K_e \cdot f$$

In which Ke is a constant related to motor characteristics. Hence, $K_e$ may be stored in a memory for retrieval for use in processing. Alternatively or additionally, Ke may be determined on the fly with the formula directly above by obtaining the resistance of the windings, the battery voltage, the angular frequency and the average current. With the sampling frequency $f_s$ divided by the annual frequency f of the motor defining the number of samples per revolution or per ripple period indicated as n, the following equation is derived for the sum of products of supply current and supply voltage per revolution or ripple period of the electromotor:

$$\sum_0^n V_{bat} - R \cdot I = K_e \cdot f \cdot \frac{f_s}{f} = K_e \cdot f_s$$

With $K_e$ and fs being constant, the sum of the back EMF per sample is at the end of each revolution or ripple period a constant. And at each revolution or ripple period, a pulse is to be detected. If at the end of each revolution or ripple period no ripple is detected and the sum of the back EMF per sample is substantially equal to the product of $K_e$ and fs, a pulse is missed. If the sum of the back EMF per sample is not substantially equal to the product of $K_e$ and fs or a multiple thereof and a pulse is detected, an erroneous pulse has been detected. These issues are addressed in the following steps.

The back EMF per sample as calculated above—battery voltage minus resistance multiplied by the current—is added to a memory value in step 524 that is initially set to zero. Subsequently, the process checks whether a ripple is detected in step 526. If this is not the case, the process branches back to step 518 via step 530.

If a ripple is detected in the supply current, the process continues to step 528 to verify whether the memory value is the same as or a multiple of the product of $K_e$ and fs. If the memory value is a multiple of the product of $K_e$ and fs, a previous ripple in the supply current may have been missed. In that case, the rotor of the electromotor has made a number of revolutions or the supply current has had ripples equal to the multiple. In that case, the value of the multiple is added to the number of determined revolutions of the electromotor or ripples in the supply current in step 532.

In another example, every second ripple or every first ripple is ignored. More general, only every $n^{th}$ ripple is assessed, in which n is the amount of brushes of the electromotor 100 or a multiple thereof. In this embodiment, the value of n in the summation equation above is preferably equal to an amount of samples per revolution.

It is noted that step 526 and step 528 may be exchanged, to the same effect: if a ripple is detected, the memory value is checked and the ripple is counted if the memory value substantially equals the product of $K_e$ and fs. Alternatively, if the memory value substantially equals the product of $K_e$ and fs, a ripple is expected—and counted if detected. Substantially equals means within this particular context that a certain threshold is to be taken into account to take product parameter spread into account. For example the winding resistance may vary from product to product. The threshold may be a fixed value or a dynamic value, for example linearly related to the instantaneous memory value.

Once the revolution or ripple count has been updated, the multiple is reset to 1 in step 534 and the memory value is reset to 0. In step 538 the number of ripples—or revolutions—is tested to the value obtained in step 510.

If the amount counted matches the amount determined in step 510 or differs by less than a predetermined threshold, either expressed in an amount or ratio (percentage), the procedure continues to step 540 in which the power supply to the electromotor 100 is switched off by means of the switch 206. The procedure continues to step 542 in which information on the position of the rear view mirror is stored in a memory like the local memory 204 and the procedure ends in step 544. If it is determined in step 538 the counted amount of pulses is below or too far below the amount determined in step 510, the process branches back to step 518.

With respect to the second flowchart 500 it is noted that several steps may exchanged with the first flowchart 300. In one embodiment, based on the first flowchart, a detected pulse is not counted if the memory value does not substantially equal the determined value. Additionally or alternatively, a pulse is—or multiple pulses are—added to the (corrected) counted amount of pulses if no pulse is detected and the memory value substantially equals the determined value or the multiple thereof.

In addition to what has been discussed in conjunction with the first flowchart 300, FIG. 4 furthermore shows a third time period 430 in which the pulse duration has dropped compared to a maximum duration at the end of the second time period 420. Subsequently, in a fourth time period 440, a higher pulse duration is detected which is followed by a fifth time period 450 in which a lower pulse duration is detected.

This phenomenon is known as stall-slip situation, in which one or more of the slip couplings alternatingly slip or do not slip. In case of slip, the outer ring 152 (FIG. 1) stalls and the rotor 110 turns, which configuration is achieved by slipping of at least one of the slip couplings. In case of no slip, the slip couplings do not slip and the rotor 110 stalls. In another configuration, the slip in the third time period 430 is more than in the fourth time period 440. The actual behaviour depends on the materials used in the slip couplings, the force with which two slipping parts engage, other factors or a combination thereof.

Figure 6:
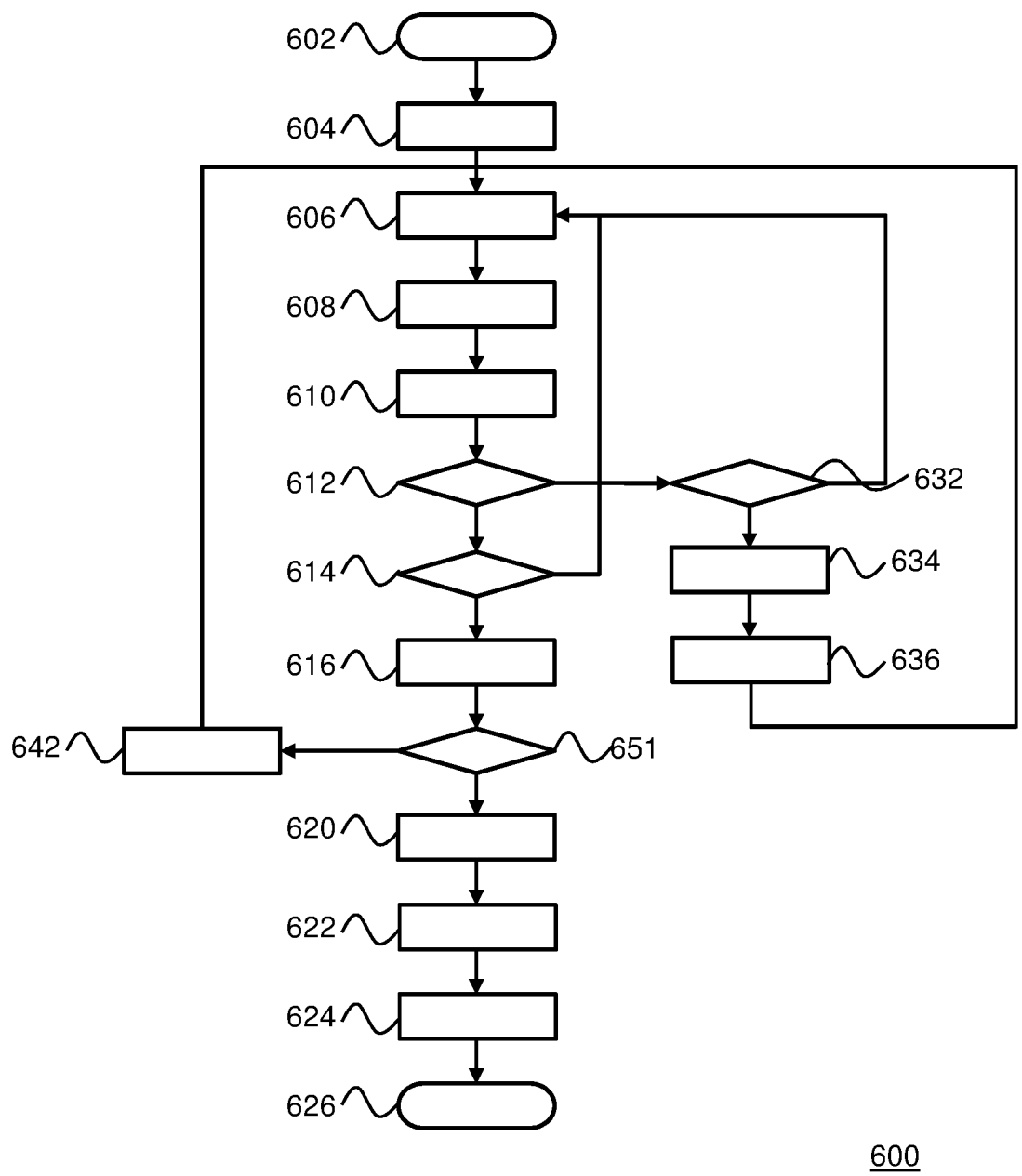
FIG. 6: shows a second flowchart depicting a method for detection of slip.

For more advanced detection of slip and exit of the drive train 170 from the slip status, a more elaborate procedure may be used, of which an example is depicted by the third flowchart 600 depicted by FIG. 6. The elements of the second flowchart 600 are briefly summarised in the list below. The procedure depicted by the second flowchart 600 may be executed in parallel to the procedure depicted by the first flowchart 300, in series or completely independent from the procedure depicted by the first flowchart 300.

| | |
|---|---|
| 602 | Start procedure |
| 604 | Power on motor |
| 606 | Determine ripple period |
| 608 | Store ripple period information and timestamp |
| 610 | regression of time vs. ripple period |
| 612 | slip flag set? |
| 614 | slope positive? |
| 616 | save timestamp as end time |
| 618 | start time to end time above threshold? |
| 620 | get lower boundary of current signal |
| 622 | get upper boundary of current signal |
| 624 | calculate ripple count |
| 626 | end procedure |
| 632 | slope > threshold? |
| 634 | save time as start time |
| 636 | set slip flag |
| 642 | clear slip flag |

The procedure starts in terminator 602 and proceeds by powering on the electromotor in step 604. In step 606, ripple period information is acquired. The ripple period, as a time period, may be determined in any way as described above, as actual time between two consecutive ripples or as an average or estimated time period, for example based on determining time to elapse for count of a particular number of ripples. In step 608, the ripple period information is stored with a timestamp, accumulated with data on previous ripple periods.

In step 610, a linear regression of time vs. ripple period is executed. This is preferably a linear regression, though other methods may be used as well for determining a local or average slope of the ripple period vs. time.

In step 612, it is tested whether a slip flag has been set. If this is not the case, the procedure branches to step 632. In step 632, it is tested whether the slope determined in step 610 is above a particular, preferably pre-determined, threshold. If this is not the case, the procedure branches back to step 606. If the slope is above a particular threshold, the system time is saved as start time in step 634 and the slip flag is set in step 636. Subsequently, the process branches back to step 606.

If in step 612 it is determined the slip flag has been set, the procedure proceeds to step 614 in which the slope determined in step 610 is positive. If the slope is determined to be positive, the process branches back to step 606. If the slope is determined to be not positive (either negative or zero), the system time is saved as end time in step 616. Subsequently, in step 618 is tested whether the interval between the saved start time and the saved end time is above a particular, for example pre-determined, threshold. If this is not the case, the slip flag is cleared in step 642 and the procedure branches back to step 606.

If the period between the start time and the end time is above the threshold, the procedure proceeds to step 620 in which a lower boundary of the ripple period is determined and to step 622 in which an upper boundary of the ripple period is determined. Based on the determined lower boundary and the determined upper boundary, ripple count is determined in step 624. Subsequently, the procedure ends in terminator 626.

In summary, driving an electromotor and a brushed electromotor in particular results in ripples in the supply current. The amount of pulses is proportional to the amount of revolutions of the rotor of the electromotor. With a flawless motor, the amount of pulses is the same with each revolution. Flaws of the electromotor, in brushes, rotor, windings and/or other components, results in fluctuations of pulses in the supply current per revolution of the rotor. By comparing an expected amount of pulses to counted pulses and using various physical parameters of the electromotor, various methods may be employed to correct a counted amount of pulses or otherwise provide an appropriate value representing displacement of the rotor of the electromotor. The time between counted pulses may also be used for determining slip of a slip coupling comprised by a drive train to which the electromotor may be coupled.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of determining a position of an actuatable object arranged to be driven by a brushed DC electromotor, the method comprising:
    driving the actuatable object by providing the electromotor with a supply current;
    obtaining an initial position of the actuatable object;
    monitoring the supply current;
    acquiring ripple period information based on the monitoring;
    determining the position of the actuatable object based on the ripple period information position of the actuatable object; and
    determining that the actuatable object has reached an outer position if the waveform of the supply current complies with at least one pre-determined condition;
    counting, based on the monitoring, counting pulses in the supply current;
    determining a measured time period between two counted consecutive pulses; and
    determining the measured time period as a function of time, wherein:
        the pre-determined condition is the measured time period as a function of time rising by more than a pre-determined amount over a pre-determined amount of time, and/or
        the pre-determined condition is the measured time period as a function of time exceeding a pre-determined value, and/or
        the pre-determined condition is the measured time period exceeding a pre-determined threshold.

2. A device for providing information on an angular speed of a DC electromotor, the device comprising:
    a monitoring module arranged to monitor electrical supply parameters including a supply current for the DC electromotor and to obtain at least one value of at least one monitored parameter; and
    a processing module arranged to:
        drive an actuatable object by providing the electromotor with a supply current;
        obtain an initial position of the actuatable object;
        monitor the supply current and acquire ripple period information based on the monitoring;
        determine the position of the actuatable object based on the ripple period information and the initial position of the actuatable object; and
        determine that the actuatable object has reached an outer position, if the waveform of the supply current complies with at least one pre-determined condition, wherein
    the processing module is further arranged to:
    obtain an indicator of an average angular speed based on the supply current;
    determine an expected time period between two consecutive pulses in the supply current for determining the expected pulse moment based on the indicator;
    obtain a counted pulse amount by counting pulses in the supply current;
    determine a measured time period between two counted consecutive pulses;
    adjust the count in at least one of the following ways to obtain an adjusted counted pulse amount:
        if the measure time period is less than the expected time period by more than a first pre-determined threshold, adjust the counted pulse amount by subtracting one; or
        if the measured time period is more than the expected time period by more than a second pre-determined threshold, adjust the counted pulse amount by adding one.

3. A control system for actuating an actuatable element of a motorised vehicle, the system comprising:
    the device according to claim 2;
    a DC electromotor; and
    a drive train for coupling the DC electromotor to the actuatable element;
    wherein the drive train comprises:
    a first transmission element connected to the DC electromotor; and
    a second transmission element arranged to be connected to the actuatable element;
    wherein the first transmission element and the second transmission element are arrange to engage with one another such that the first transmission element and the second transmission element move together if a coupling torque between the first transmission element and the second transmission element is below a pre-determined torque level and the first transmission element and the second transmission element slip relative to one another if the coupling torque is above a pre-determined torque level.

4. The control system according to claim 3, wherein the control system is incorporated into a rear view mirror module, and a rear-view mirror is the actuatable element.

5. The control system according to claim 3, wherein the control system is incorporated into a motorised vehicle comprising the actuatable element.

6. The method according to claim 1, further comprising setting the outer position as the initial position.

7. The method according to claim 1, further comprising:
receiving a command for actuating the actuatable object;
providing a DC electrical energy supply to the DC electromotor for executing actuation of the actuatable object in accordance with the command.

8. The method according to claim 1, further comprising:
determining an expected pulse moment at which a pulse in the supply current is expected to occur; and
counting the pulse if the pulse is detected at the expected pulse moment.

9. The method according to claim 8, further comprising:
obtaining an indicator of an average angular speed based on the supply current;
based on the indicator, determining an expected time period between two consecutive pulses in the supply current for determining the expected pulse moment;
obtaining a counted pulse amount by counting pulses in the supply current;
determining a measured time period between two counted consecutive pulses; and
adjusting the count in at least one of the following ways to obtain an adjusted counted pulse amount:
if the measure time period is less than the expected time period by more than a first pre-determined threshold, adjust the counted pulse amount by subtracting one; and
if the measured time period is more than the expected time period by more than a second pre-determined threshold, adjust the counted pulse amount by adding one.

10. The method according to claim 9, wherein the indicator is a time related factor providing an indication of an average time period between two consecutive pulses.

11. The control system according to claim 5, wherein the actuatable element is an air flow influencing device.

* * * * *